(12) United States Patent
Wang et al.

(10) Patent No.: US 12,460,792 B1
(45) Date of Patent: Nov. 4, 2025

(54) LIGHTING FIXTURE WITH ADJUSTABLE LENS MODULE

(71) Applicant: Jiangsu Dalite Electrical Technology Co., Ltd., Changzhou (CN)

(72) Inventors: Yanpeng Wang, Shanghai (CN); Haijin Zhu, Changzhou (CN)

(*) Notice: Subject to any disclaimer, the term of this patent is extended or adjusted under 35 U.S.C. 154(b) by 0 days.

(21) Appl. No.: 18/656,500

(22) Filed: May 6, 2024

(51) Int. Cl.
  *F21V 14/06* (2006.01)
  *F21V 5/00* (2018.01)
  *F21V 17/02* (2006.01)
  *F21Y 105/16* (2016.01)
  *F21Y 115/10* (2016.01)

(52) U.S. Cl.
  CPC ............. *F21V 14/06* (2013.01); *F21V 5/007* (2013.01); *F21V 17/02* (2013.01); *F21Y 2105/16* (2016.08); *F21Y 2115/10* (2016.08)

(58) Field of Classification Search
  CPC .......... F21V 5/007; F21V 17/02; F21V 17/14
  See application file for complete search history.

(56) References Cited

U.S. PATENT DOCUMENTS

| | | | |
|---|---|---|---|
| 2011/0063836 A1* | 3/2011 | Salm | F21V 5/04 359/811 |
| 2016/0215961 A1* | 7/2016 | Kjeldsen | F21V 5/007 |
| 2021/0348740 A1* | 11/2021 | Bory | F21V 14/06 |
| 2023/0296227 A1* | 9/2023 | Smets | F21V 17/101 362/382 |

* cited by examiner

*Primary Examiner* — Eric T Eide
(74) *Attorney, Agent, or Firm* — Tsz Lung Yeung

(57) ABSTRACT

A lighting fixture includes a main housing, an illuminating module including a plurality of illuminating units, and an adjustable lens module. The adjustable lens module is detachably mounted in the main housing at a position corresponding to the illuminating module. The adjustable lens module includes at least one lens element which is in optical communication with the illuminating units. At least one of the illuminating module and the adjustable lens module are arranged to adjustably move with respect to each other so as to alter a planar relative position between the illuminating module and the adjustable lens module for adjusting a light type coming out from the lens element with respect to the illuminating units to achieve at least two light types of the lighting fixture.

5 Claims, 8 Drawing Sheets

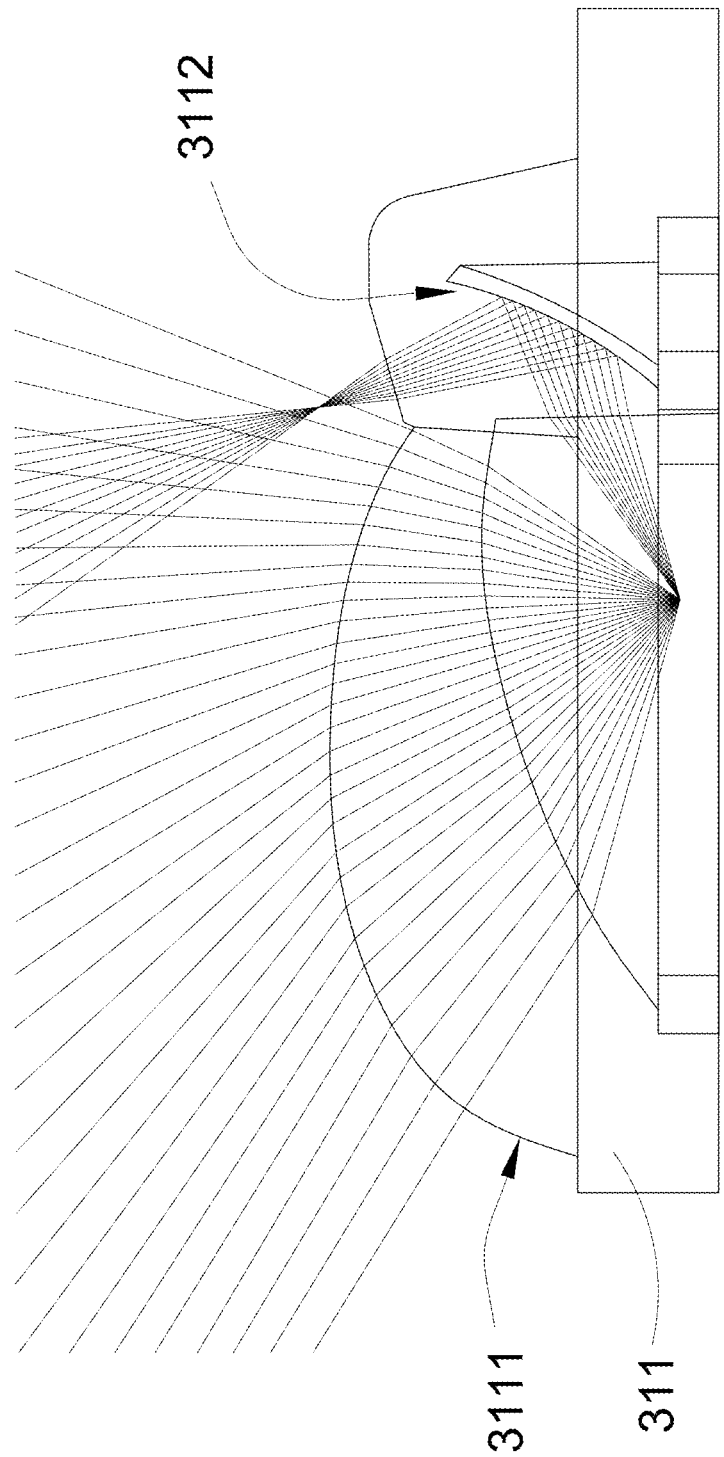

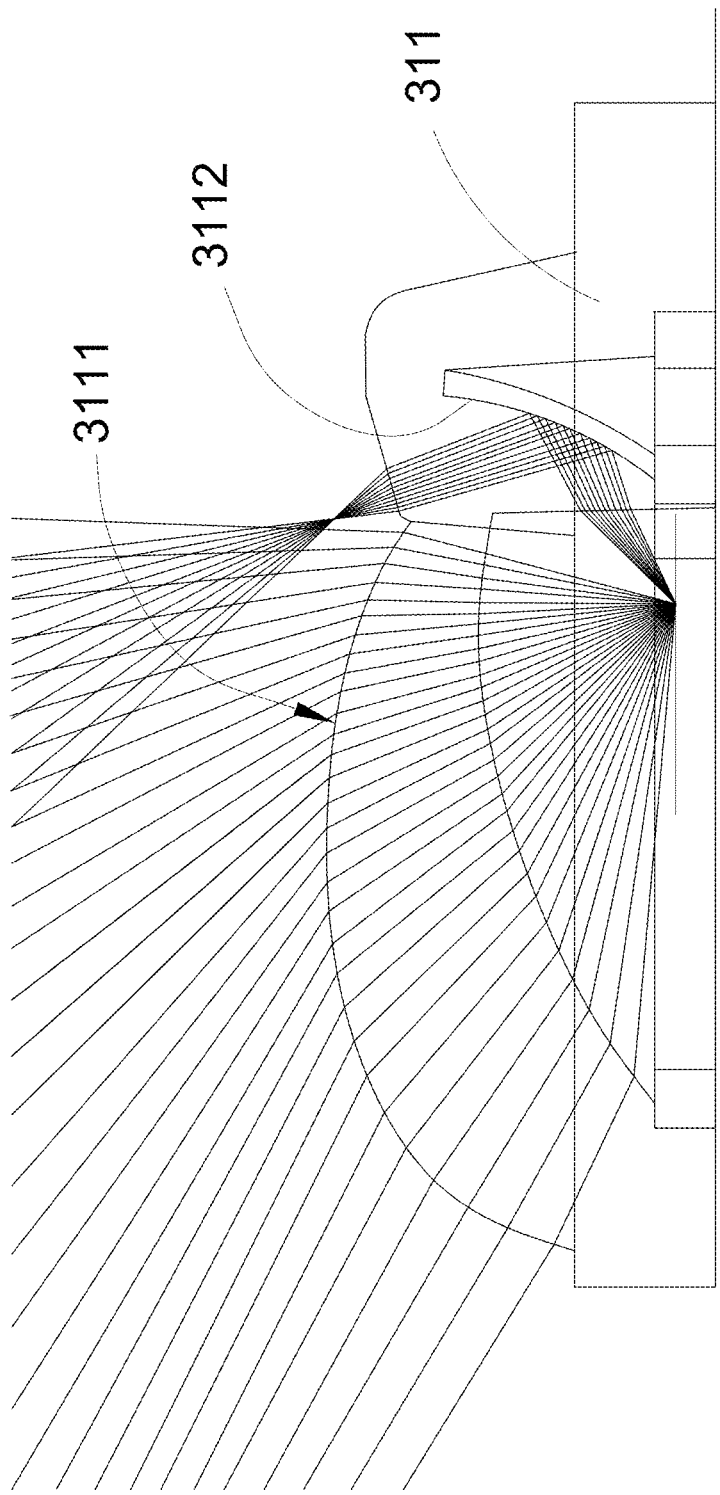

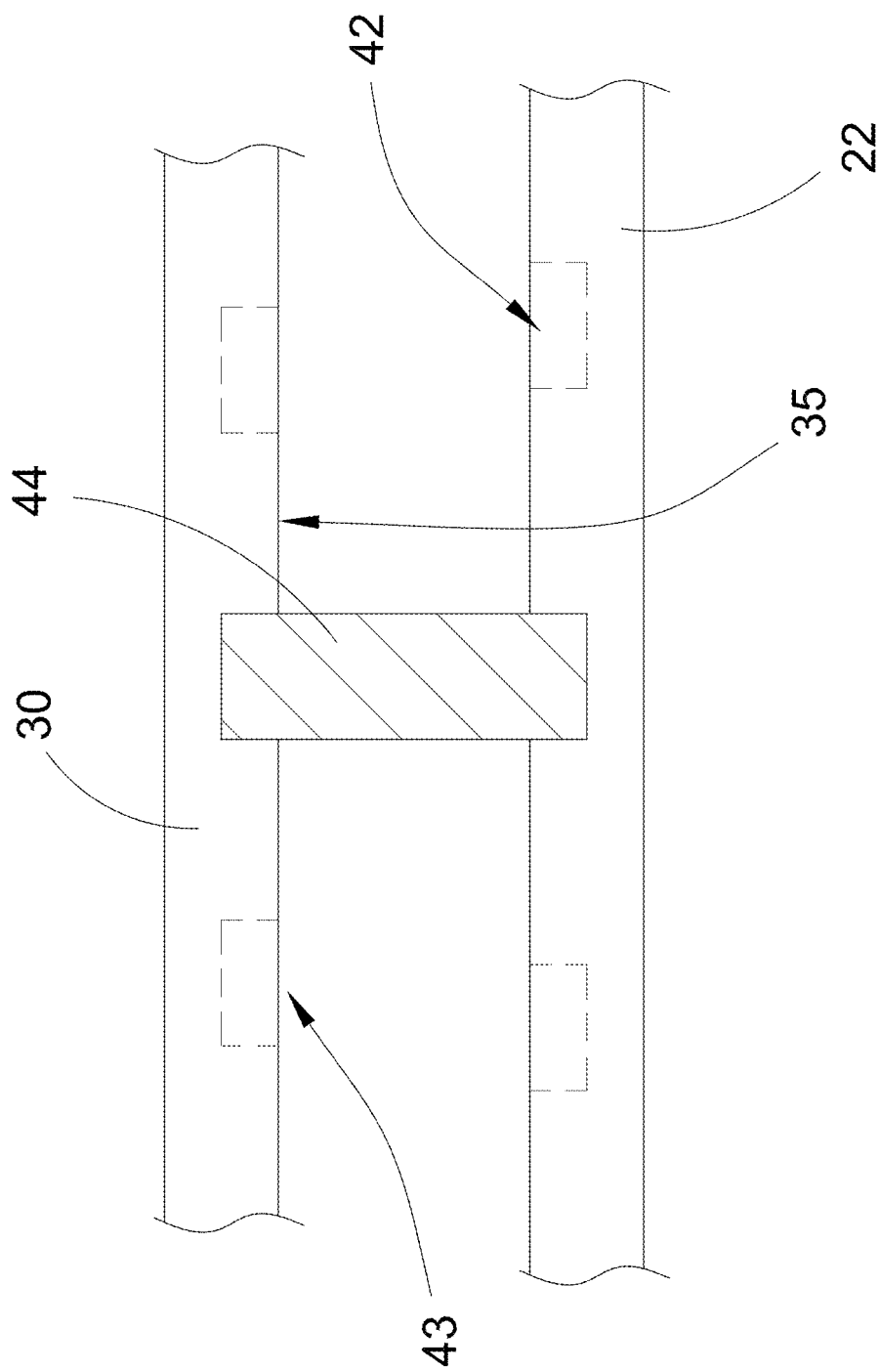

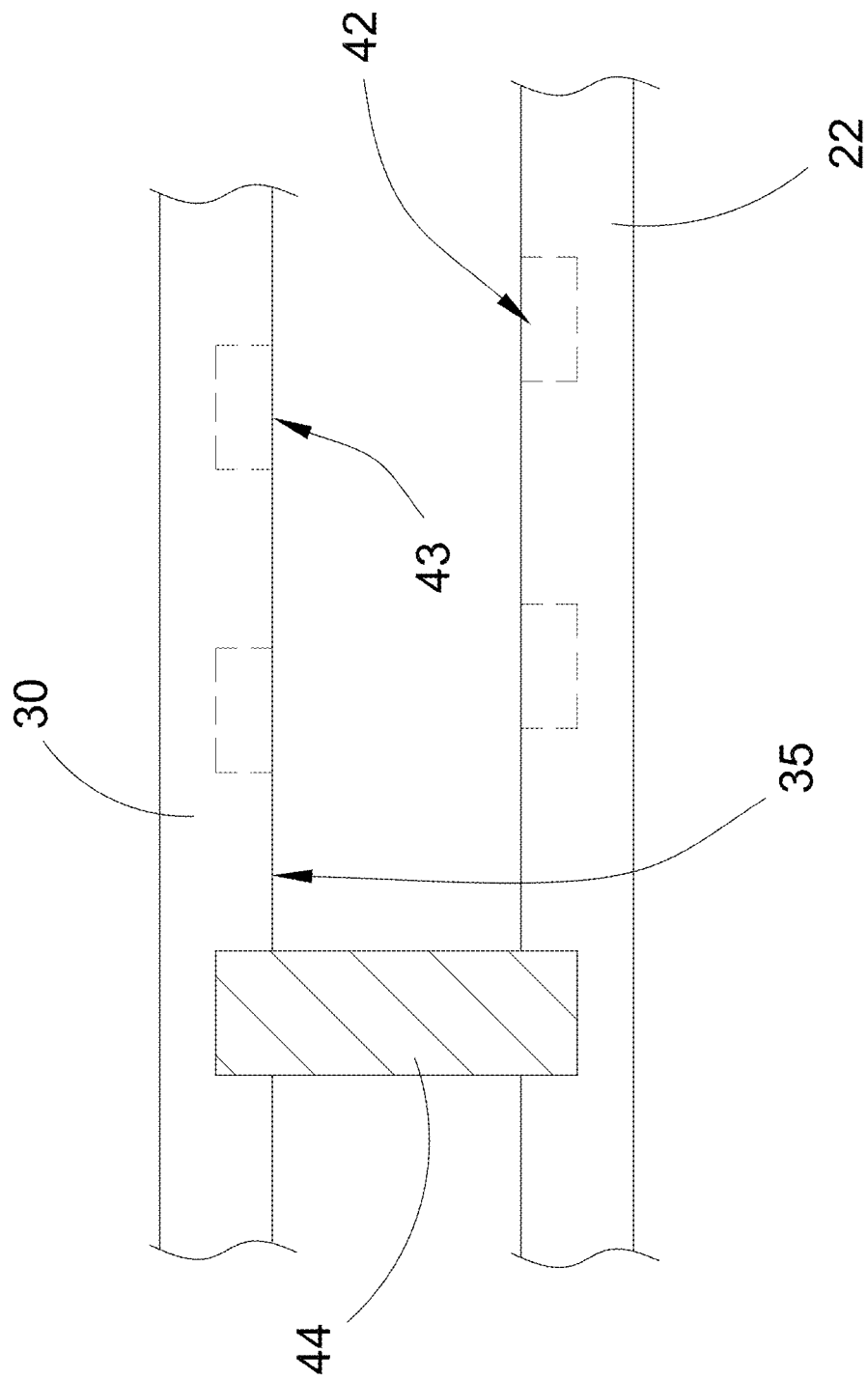

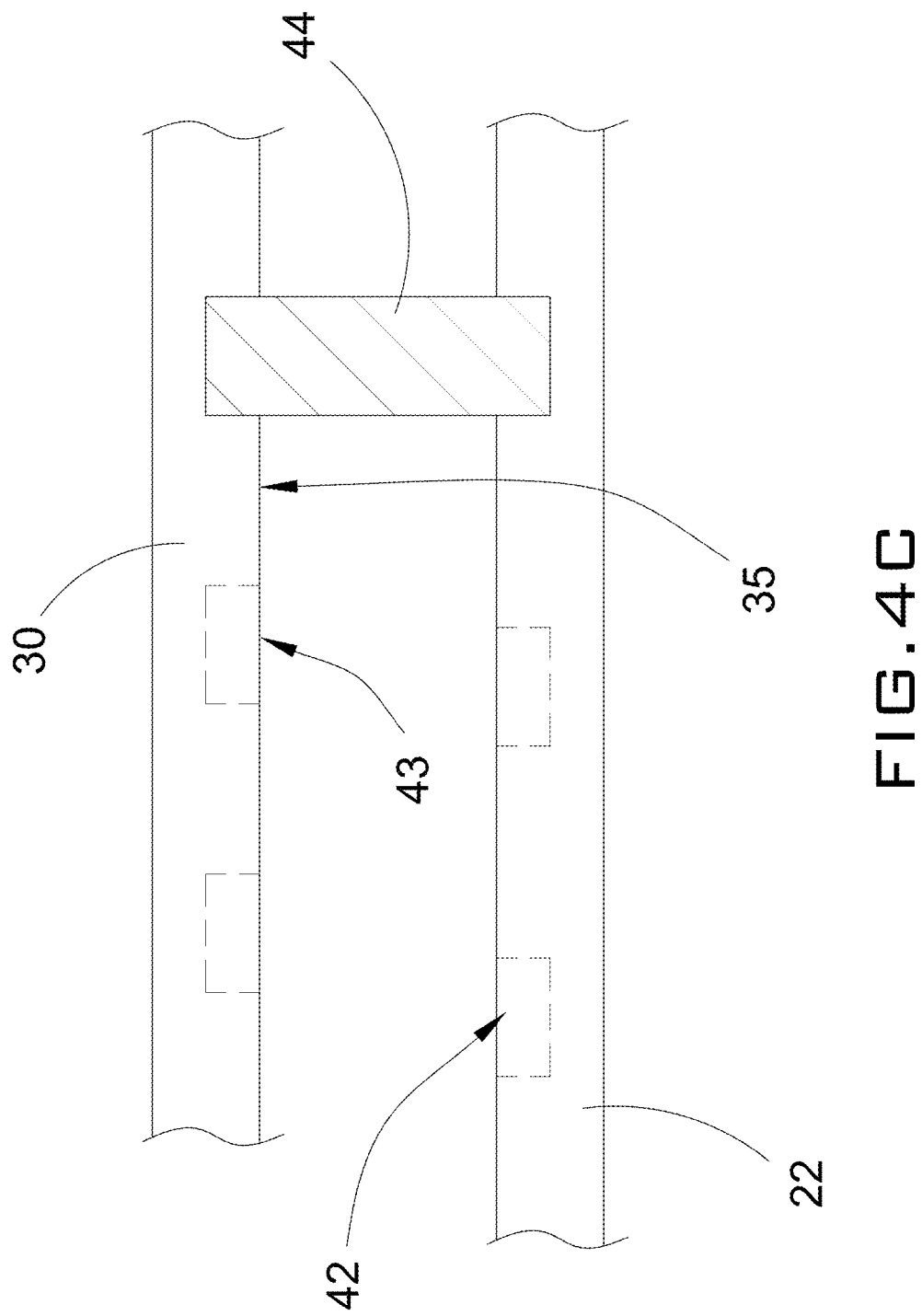

LIGHTING FIXTURE WITH ADJUSTABLE LENS MODULE

BACKGROUND OF THE PRESENT INVENTION

Field of Invention

The present invention relates to a lighting fixture, and more particularly to a lighting fixture comprising an adjustable lens module which is capable of producing illumination having different light types.

Description of Related Arts

Lighting fixtures, such as street lamps, have widely been used all over the world to provide focused and projected light for illumination in dark environment. Conventionally, such lighting fixtures may be called T2, T3, T4, T5 etc. In some conventions, the major difference between these types of lighting fixture is the diameter of the lighting tubes. For example, a T2 lighting fixture produces light from a lighting tube having approximately 7 mm diameter which is mainly used in area of limited space. On the other hand, a T5 lighting fixture produces light from a lighting tube having approximately 16 mm diameter and may be used in large public space.

The major problem for these conventional lighting fixtures is that they lack flexibility. A lighting fixture of a specific type, such as a T2 lighting fixture, may utilize a specific type of lens or illuminating units to accomplish a specific purpose. This lens cannot be replaced. As a result, when situations arise where different light types are required, another lighting fixture must be installed to address the relevant situations. This causes substantial inconvenience and waste of materials, time and labor.

As a result, there is a need to develop a lighting fixture wherein a single unit may provide illumination of different light types.

SUMMARY OF THE PRESENT INVENTION

Certain variations of the present invention provide a lighting fixture comprising an adjustable lens module which is capable of producing illumination having different light types.

Certain variations of the present invention provide a lighting fixture comprising an adjustable lens module, wherein a relative position of an illuminating module and a adjustable lens module can be conveniently adjusted so as to produce illumination having different light types.

In one aspect of the present invention, it provides a lighting fixture, comprising:

a main housing having a receiving cavity;

an illuminating module mounted in the receiving cavity, the illuminating module comprising a plurality of illuminating units for generating illumination; and an adjustable lens module detachably mounted in the receiving cavity of the main housing at a position corresponding to the illuminating module, the adjustable lens module comprising at least one lens element which is in optical communication with the illuminating units, at least one of the illuminating module and the adjustable lens module being arranged to adjustably move with respect to each other so as to alter a planar relative position between the illuminating module and the adjustable lens module for adjusting a light type coming out from the lens element with respect to the illuminating units to achieve at least two light types of the lighting fixture.

This summary presented above is provided merely to introduce certain concepts and not to identify any key or essential features of the claimed subject matter.

BRIEF DESCRIPTION OF THE DRAWINGS

FIG. 3A to FIG. 3C illustrates a lens element of the lighting fixture when it is generating different light types.

FIG. 4A to FIG. 4C are schematic diagrams illustrating the relationship between the illuminating module and the adjustable lens module according to the preferred embodiment of the present invention.

DETAILED DESCRIPTIONS OF THE PRESENT INVENTION

Figure 1:
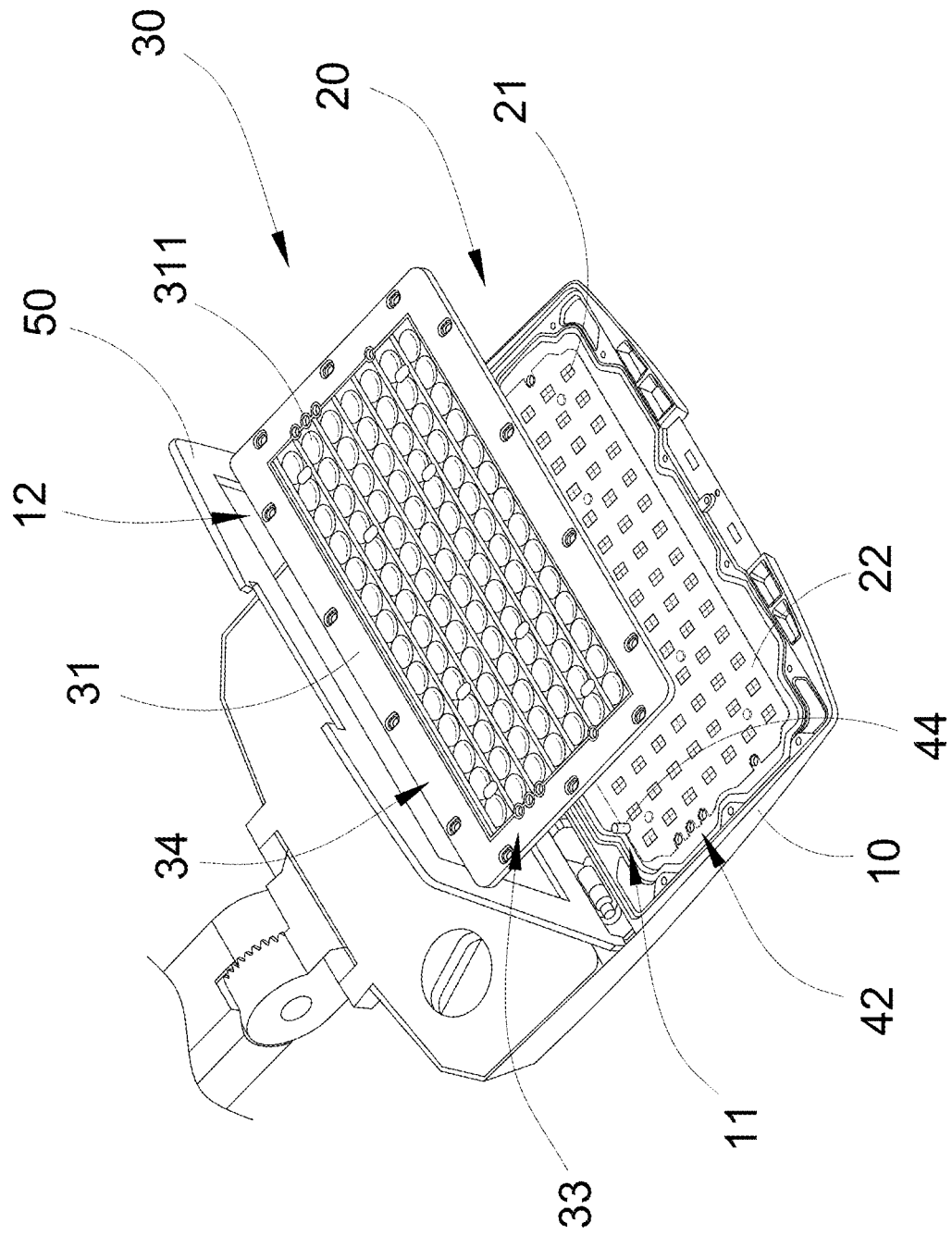
FIG. 1 is an exploded perspective view of a lighting fixture according to a preferred embodiment of the present invention.

The following detailed description of the preferred embodiment is the preferred mode of carrying out the invention. The description is not to be taken in any limiting sense. It is presented for the purpose of illustrating the general principles of the present invention.

In the following descriptions, it should also be appreciated that the terms "arrange" and "set" in the following description refer to the connecting relationship in the accompanying drawings for easy understanding of the present invention. For example, the "arrange" and "set" may refer to one element directly or indirectly set or arrange on another element. Therefore, the above terms should not be an actual connection limitation of the elements of the present invention.

It should also be appreciated that the terms "center", "length", "width", "thickness", "top", "bottom", "front", "rear", "left", "right", vertical", "horizontal", "upper", "lower", "interior", and "exterior" in the following description refer to the orientation or positioning relationship in the accompanying drawings for easy understanding of the present invention without limiting the actual location or orientation of the present invention. Therefore, the above terms should not be an actual location limitation of the elements of the present invention.

Moreover, it should be appreciated that the terms "first", "second", "one", "a", and "an" in the following description refer to "at least one" or "one or more" in the embodiment. In particular, the term "a" in one embodiment may refer to "one" while in another embodiment may refer to "more than one". Therefore, the above terms should not be an actual numerical limitation of the elements of the present invention.

It should be appreciated that the terms "install", "connect", "couple", and "mount" in the following description refer to the connecting relationship in the accompanying drawings for easy understanding of the present invention. For example, the connection may refer to permanent connection or detachable connection. Therefore, the above terms should not be an actual connection limitation of the elements of the present invention.

Referring to FIG. 1 to FIG. 2, FIG. 3A to FIG. 3C and FIG. 4A to FIG. 4C of the drawings, a lighting fixture according to a preferred embodiment of the present invention is illustrated. Broadly, the lighting fixture may comprise a main housing 10 having a receiving cavity 11, an illuminating module 20, and an adjustable lens module 30.

The illuminating module 20 may be mounted in the receiving cavity 11. Moreover, the illuminating module 20 may comprise a plurality of illuminating units 21 for generating illumination.

The adjustable lens module 30 may be detachably mounted in the receiving cavity 11 of the main housing 10 at a position corresponding to the illuminating module 20. The adjustable lens module 30 may comprise at least one lens element 311 which is in optical communication with the illuminating units 21, at least one of the illuminating module 20 and the adjustable lens module 30 may be arranged to adjustably move with respect to each other so as to alter a planar relative position between the illuminating module 20 and the adjustable lens module 30 for adjusting a light type coming out from the lens element 311 with respect to the illuminating units 21 to achieve at least two light types of the lighting fixture.

For the purpose of showing the structural details of the present invention, FIG. 1 illustrates the lighting fixture of the present invention in an upside-down manner. Thus, the view illustrated in FIG. 1 is actually a bottom perspective view of the light fixture. According to the preferred embodiment of the present invention, the main housing 10 may have a light projection window 12 communicating with the adjustable lens module 30 for allowing light beams to travel out of the main housing 10 through the light projection window 12. The light projection window 12 may be configured as a through opening, as shown in FIG. 1 of the drawings. The illuminating module 20 and the adjustable lens module 30 may be received in the receiving cavity 11 of the main housing 10.

The illuminating module 20 may comprise a main control board 22, and a plurality of illuminating units 21 mounted on the main control board 22. A control circuitry may be implemented on the main control board 22 for controlling an operation of the illuminating units 21. Accordingly, the control circuitry may contain a plurality of electrical components for activating and controlling the operation of the illuminating units 21. The control circuitry may be implemented on one side (such as a top side) of the main control board 22, while the illuminating units 21 may be mounted on the other side (such as a bottom side) of the main control board 22.

Each of the illuminating units 21 may be configured as a LED and may be arranged to generate high-intensity light beam at a predetermined direction. As shown in FIG. 1 of the drawings, the illuminating units 21 may be arranged in an array on the main control board 22 for generating light beams of predetermined patterns. It is worth mentioning that the arrangement of the illuminating units 21 on the main control board 22 may be varied according to the circumstances in which the present invention is manufactured.

The adjustable lens module 30 may comprise a peripheral frame 31 and a plurality of lens elements 311 supported by the peripheral frame 31, wherein each of the lens elements 311 may have a predetermined outer contour to provide optical alteration (such as diffraction, reflection etc.) to the light beams generated from the illuminating units 21. According to the preferred embodiment of the present invention, each of the lens elements 311 may be configured from transparent material such as glass which allows light to pass through. It is worth mentioning that each of the lens elements 311 of the adjustable lens module 3 may have a predetermined external contour so as to create a predetermined optical property. For example, each of the lens elements 311 may have an optimally convex and/or concave contour so as to modify the light type generated by the lighting fixture of the present invention.

Figure 2:
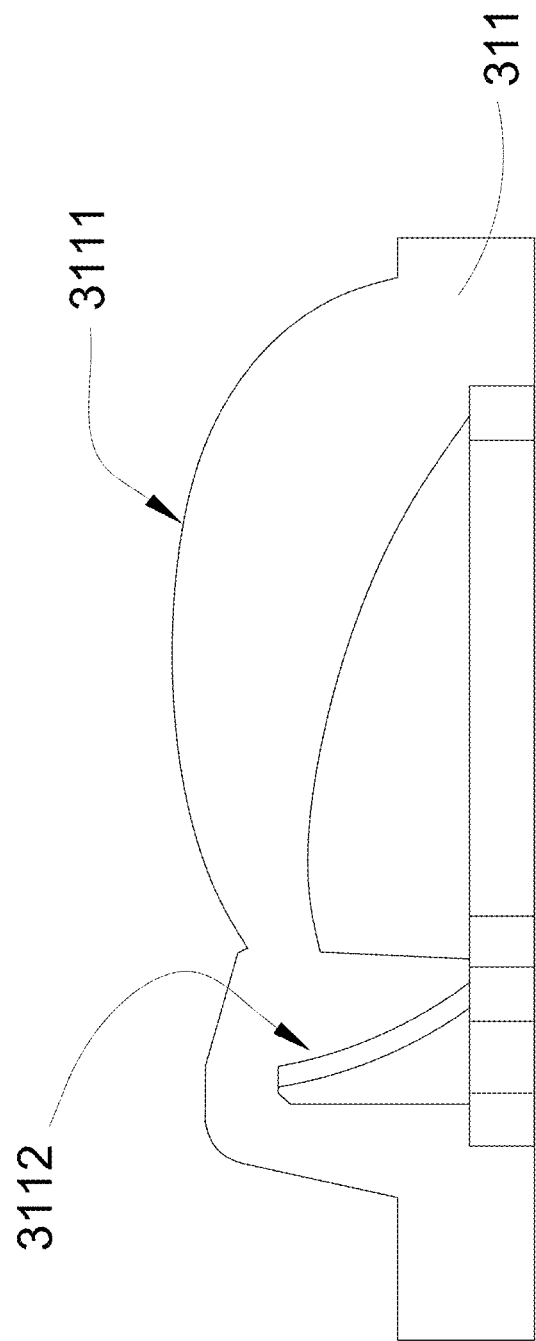
FIG. 2 is a schematic diagram of a lens element of the lighting fixture according to the preferred embodiment of the present invention.

Referring to FIG. 2 of the drawings, each of the lens elements 311 may have at least one of a convex portion 3111 and a reflective portion 3112 arranged in a predetermined contour to form a predetermined optical property with respect to the corresponding illuminating unit 21. The number and arrangement of the convex portion 3111 and the concave portion 3112 may be varied according to manufacturing circumstances.

This configuration allows even distribution of light on the lens elements 311. When the adjustable lens module 30 is moved in a planar direction with respect to the illuminating module 2, the shift of the lens elements 311 may create different light type (which may be referred to different optical effects) by the light originated from the corresponding illuminating element 21. In other words, the angle of propagation of light on the lens elements 311 may change correspondingly when the adjustable lens module 30 is moved along a planar direction of the illuminating module 2.

In this preferred embodiment of the present invention, the adjustable lens module 30 may be selectively moved in a planar direction along three discrete positions with respect to the illuminating module 2 so as to create three different light types (optical effect) of the lighting fixture. In other words, by physically moving the adjustable lens module 30 with respect to the illuminating module 2 along a planar direction thereof, the lighting fixture of the present invention may be arranged to produce different light types. It should be mentioned that the number of light types produced by the lighting fixture of the present invention may be varied according to the circumstances in which the present invention is manufactured and configured.

Referring to FIG. 1 and FIG. 4A to FIG. 4C of the drawings, the lighting fixture may further have a plurality of securing slots 42 spacedly provided on the main control board 22 of the illuminating module 20, and a plurality of retention slots 43 spacedly provided on the peripheral frame 31 of the adjustable lens module 30. In this preferred embodiment of the present invention, each of the securing slots 42 and the retention slots 43 may be configured as a hole having a circular cross-sectional shape. Other cross-sectional shapes are also possible, however. The main control board 22 may be securely attached on the main housing 10 in the receiving cavity 11 through traditional connectors such as screws.

The lighting fixture may further comprise at least one positioning pin 44 provided in the receiving cavity 11 of the main housing 10. The positioning pin 44 may detachably attach between the securing slot 42 and the corresponding retention slot 43 for selectively and adjustably connecting the illuminating module 20 to the adjustable lens module 30.

The positioning pin 44 may be configured as having a column structure and having a diameter corresponding to that of the securing slot 42 and the retention slot 43. The position of the positioning pins 44 on the retention slots 43 may dictate the light type generated by the lighting fixture of the present invention. This is because a distance between each two retention slots 43 is smaller than that of the securing slots 42.

For each of the light types generated by the lighting fixture, the relative position of the illuminating module 20 and the adjustable lens module 30 may be predetermined and pre-arranged. In this preferred embodiment of the present invention, the lighting fixture may be arranged to generate one of three light types which correspond to three relative positions between the illuminating module 20 and the adjustable lens module 30 respectively. Thus, the position of the positioning pin 44 on the mounting slots 41 may control the relative position between the illuminating module 20 and the adjustable lens module 30.

The adjustable lens module 30 may further have a plurality of light type markings 33 formed on the adjustable lens module 30, the main housing 10 or the illuminating module 20 for signifying the light types offered by the adjustable lens module 30. The light type markings 33 may be formed corresponding to the retention slots 43 respectively. In this preferred embodiment of the present invention, each of the retention slots 43 may be formed on the main housing 10 and may be arranged to represent the corresponding light type offered by the adjustable lens module 30. The retention slots 43 may be formed on a bottom side 35 of the adjustable lens module 30 while the light type markings 33 may be formed on the main housing 10 adjacent to the securing slots 42. For example, the light type markings 33 may be illustrated as "T2", "T3" and "T4" respectively.

When the illuminating module 20 is attached on the main housing 10, a user may selectively insert one end of the positioning pin 44 in the securing slot 42. After that, a user may attach the adjustable lens module 30 on the illuminating module 20 in such a manner that the other end of the positioning pin 44 may be inserted in the corresponding retention slot 43. This retention slot 43 may correspond on the same light type as selected by the user. As such, the positioning pin 44 may extend between the corresponding retention slot 43 and the securing slot 42. At this time, the relative position of the illuminating module 20 and the adjustable lens module 30 may be fixed and secured, and this represents a particular light type generated by the adjustable lens module 30 as shown by the corresponding light type marking 33. For example, one end of the positioning pin 44 may be inserted in a securing slot 42 having the light type marking "T2". Another end of the same positioning pin 44 may also be inserted in the retention slot 43 having the same light type marking "T2". The illuminating module 20 and the adjustable lens module 30 may then be secured by external connectors, such as a biasing frame 50 pivotally connected to the main housing 10, or by any other methods or components. The goal is to restrain the relative position between the illuminating module 20 and the adjustable lens module 30 once a particular light type is set.

It is worth mentioning that by changing the position of the positioning pin 44, the relative position between the illuminating module 20 and the adjustable lens module 30 may be altered, and this alteration of the relative position may allow the adjustable lens module 30 to produce different light types (i.e. different lighting effects).

When the user wishes to switch light type, he or she may take out the positioning pin 44 and insert it into another securing slot 42 and the corresponding retention slot 43 in the same manner described above so as to offset a relative position between the illuminating module 20 and the adjustable lens module 30. When the relative position between the illuminating module 20 and the adjustable lens module 30 is offset, the adjustable lens module 30 is capable of producing a different light effect.

Referring to FIG. 2 of the drawings, each of the lens elements 311 of the adjustable lens module 30 may have the convex portion 3111 and the reflective portion 3112. The reflective portion 3112 may be arranged to reflect light beams coming from the illuminating units 21 at a predetermined direction. On the other hand, the convex portion 3111 of each of the lens elements 311 may be arranged to reflect light beams coming from the illuminating units 21. As illustrated in FIG. 2 of the drawings, each of the lens elements 311 may be arranged to optically communicate with one corresponding illuminating unit 21 which may be configured as a LED. The illuminating unit 21 may be positioned above the corresponding lens element 311. The convex portion 3111 and the reflective portion 3112 may be arranged in a side-by-side manner and may form as an integral lens element 311.

Figure 3B:
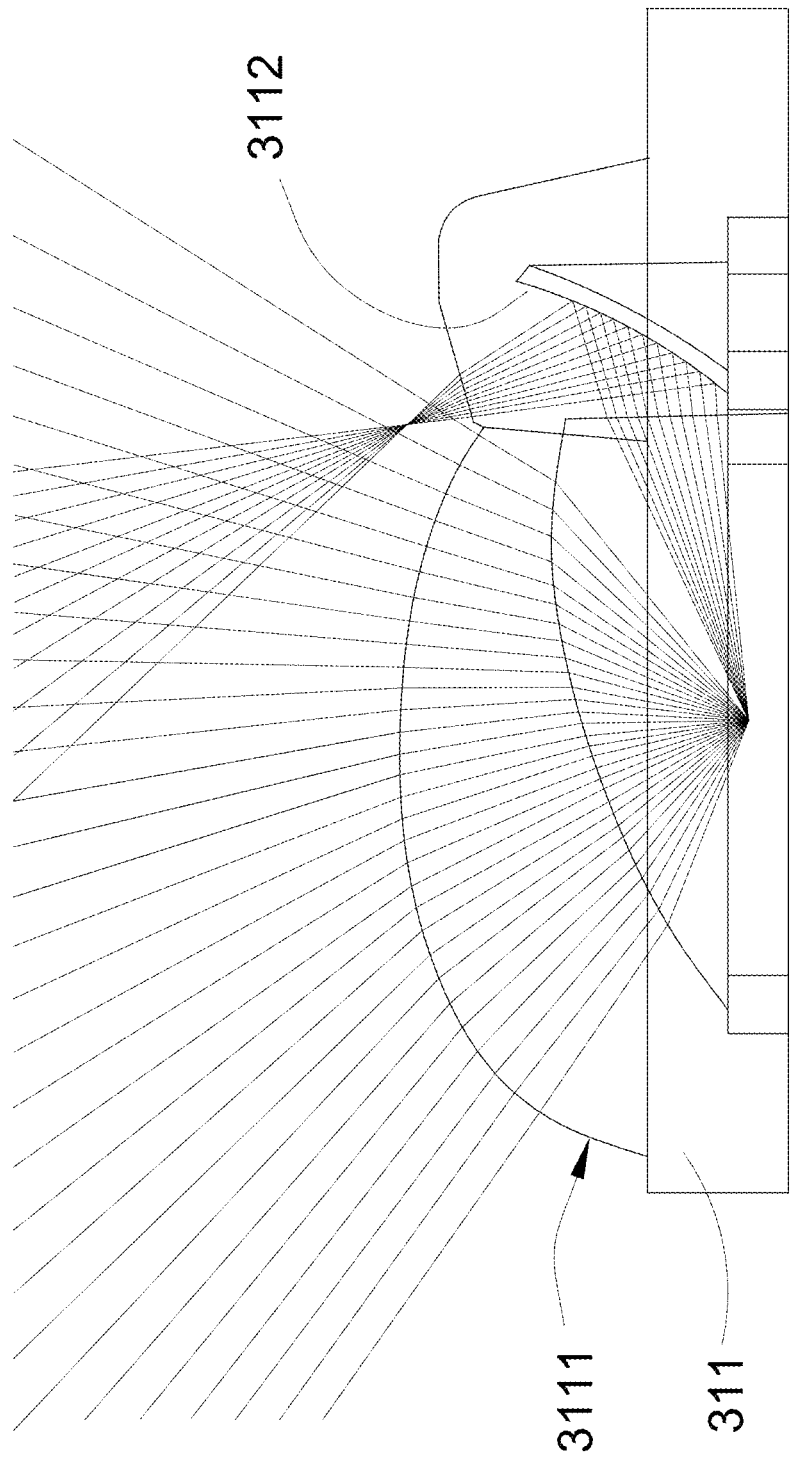

According to the preferred embodiment of the present invention, the light types generated by the lighting fixture of the present invention may be one of three light types, which may be signified as T2 light type, T3 light type and T4 light type respectively. These light types may correspond to an offset of the adjustable lens module 30. In this preferred embodiment of the present invention, T2 and T4 may represent the positions of the adjustable lens module 30 to be offset from T3 position toward two sides (left side and right side) from the position of the adjustable lens module 30 at T3 respectively. Referring to FIG. 3A of the drawings, T3 light type may represent the light beam passing through the lens elements 311 with a polarization angle of 60°. As shown in FIG. 3B of the drawings, T2 light type may represent the light beam passing through the lens elements 311 with a polarization angle of 45°. As shown in FIG. 3C of the drawings, T4 light type may represent the light beam passing through the lens elements 311 with a polarization angle of 70°.

It is worth mentioning that the number of light types and the corresponding polarization angle may vary depending on the actual circumstances in which the present invention is manufactured or utilized. The lighting fixture of the present invention may be utilized as a street lamp.

From the forgoing descriptions, one skilled in the art may appreciate that the lighting fixture of the present invention may allow a user to select one of the three light types by altering the relative planar position of the adjustable lens module 30 with respect to the illuminating module 20. The user may be able to utilize the positioning pin 44 and insert it into one of the securing slots 42. After that, the user may dispose the adjustable lens module 30 on the illuminating module 20 by positioning the corresponding retention slot 43 on the positioning pin 44, and this affix the relative position between the adjustable lens module 30 and the illuminating module 20. Each pre-set relative position of the adjustable lens module 30 with respect to the illuminating module 20 may generate a light type which corresponds to a predetermined optical property for the light coming out from the adjustable lens module, such as different polarization angles described above. It is worth mentioning that the adjustable lens module 30 and the illuminating module 20 may move relative to each other along a parallel plane. Thus, they don't move toward or away from each other. A vertical distance between the adjustable lens module 30 and the illuminating module 20 is not altered and remains the same irrespective of any chosen light type.

The present invention, while illustrated and described in terms of a preferred embodiment and several alternatives, is not limited to the particular description contained in this specification. Additional alternative or equivalent components could also be used to practice the present invention.

What is claimed is:

1. A lighting fixture, comprising:
a main housing having a receiving cavity;

an illuminating module mounted in the receiving cavity, the illuminating module comprising a plurality of illuminating units for generating illumination, and a main control board, wherein the illuminating units are mounted on the main control board, each of the illuminating units being configured as a LED arranged to generate light;

an adjustable lens module detachably mounted in the receiving cavity of the main housing at a position corresponding to the illuminating module, the adjustable lens module comprising at least one lens element which is in optical communication with the illuminating units, at least one of the illuminating module and the adjustable lens module being arranged to adjustably move with respect to each other so as to alter a planar relative position between the illuminating module and the adjustable lens module for adjusting a light type coming out from the lens element with respect to the illuminating units to achieve at least two light types of the lighting fixture, the adjustable lens module further comprising a peripheral frame supporting the lens elements, and further having a predetermined outer contour to provide optical alteration to the light generated from the illuminating units, each of the lens element having at least one of a convex portion and a reflective portion arranged in a predetermined contour for altering an angle of propagation of light passing through the corresponding lens element; and a plurality of securing slots spacedly provided on the main control board of the illuminating module, a plurality of retention slots spacedly provided on the peripheral frame of the adjustable lens module, and further comprising at least one positioning pin arranged to be selectively attached between one of the securing slot and the corresponding retention slot for selectively and adjustably connecting the illuminating module to the adjustable lens module.

2. The lighting fixture, as recited in claim 1, wherein a distance between each two adjacent retention slots is smaller than that of the securing slots.

3. The lighting fixture, as recited in claim 2, wherein the adjustable lens module further has a plurality of light type markings formed on at least one of the adjustable lens module, the main housing and the illuminating module for signifying the light types offered by the adjustable lens module, and for allowing a user to correctly position the adjustable lens module on the illuminating module.

4. The lighting fixture, as recited in claim 3, wherein the lens element has both the convex portion and the reflective portion arranged in a side-by-side configuration, the reflective portion being arranged to reflect light beam coming from the corresponding illuminating unit at a predetermined direction, the convex portion being arranged to deflect light beam coming from the corresponding illuminating unit.

5. The lighting fixture, as recited in claim 4, wherein the positioning pin is arranged to selectively extend between a retention slot and a corresponding securing slot to selectively adjust a relative position between the adjustable lens module and the illuminating module so as to allow the light beam from the illuminating unit to pass through the lens element to have one of a plurality of predetermined polarization angles.

\* \* \* \* \*